(12) United States Patent
Meredith et al.

(10) Patent No.: US 10,229,411 B2
(45) Date of Patent: *Mar. 12, 2019

(54) FRAUD ANALYSIS FOR A LOCATION AWARE TRANSACTION

(71) Applicant: AT&T Mobility II LLC, Atlanta, GA (US)

(72) Inventors: Sheldon Meredith, Marietta, GA (US); Mark Austin, Roswell, GA (US); John Pastore, Suwanee, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 966 days.

This patent is subject to a terminal disclaimer.

(21) Appl. No.: 14/704,949

(22) Filed: May 5, 2015

(65) Prior Publication Data
US 2015/0235223 A1 Aug. 20, 2015

Related U.S. Application Data

(63) Continuation of application No. 13/204,535, filed on Aug. 5, 2011, now Pat. No. 9,053,513.

(51) Int. Cl.
*G06Q 40/00* (2012.01)
*G06Q 20/40* (2012.01)
(Continued)

(52) U.S. Cl.
CPC ......... *G06Q 20/4016* (2013.01); *G06Q 20/00* (2013.01); *G06Q 20/3224* (2013.01); *G06Q 40/00* (2013.01); *H04W 4/02* (2013.01)

(58) Field of Classification Search
None
See application file for complete search history.

(56) References Cited

U.S. PATENT DOCUMENTS 4,718,081 A  1/1988  Brenig
5,515,062 A  5/1996  Maine et al.
(Continued)

FOREIGN PATENT DOCUMENTS

EP  0856746 A2  8/1998
EP  1145526  10/2001
(Continued)

OTHER PUBLICATIONS

Ouyang, Y. & Fallah, M. H., "The Impact of Cell Site Re-homing on the Performance of UMTS Core Networks", International Journal of Next Generation Network (IJNGN), vol. 2, No. 1, Mar. 2010.*

(Continued)

*Primary Examiner* — Olabode Akintola
(74) *Attorney, Agent, or Firm* — Amin, Turocy & Watson, LLP

(57) ABSTRACT

Fraud analysis for a location aware transaction is disclosed. Location information can be associated with historical fraud events. A location of user equipment can be analyzed against historical fraud information associated with the location to facilitate determination of a fraud factor value. The fraud factor value can reflect a determination related to a likelihood of fraud occurring in an instant transaction based on the historic fraud events proximate to the location. The determination can be based on fraud rules. Further aspects provide for abstraction of the fraud factor to limit exposure of personal information associated with wireless carrier subscribers in fraud analysis for a location aware transaction.

20 Claims, 11 Drawing Sheets

(51) Int. Cl.
*G06Q 20/00* (2012.01)
*G06Q 20/32* (2012.01)
*H04W 4/02* (2018.01)

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,058,260 A | 5/2000 | Brockel et al. |
| 6,108,532 A | 8/2000 | Matsuda et al. |
| 6,108,556 A * | 8/2000 | Ito .................. G01S 5/0036 455/456.2 |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,203,752 B2 | 4/2007 | Rice et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,402,356 B2 | 3/2013 | Martinez et al. |
| 8,417,264 B1 | 4/2013 | Whitney et al. |
| 8,437,790 B1 | 5/2013 | Hassan et al. |
| 8,464,164 B2 | 6/2013 | Hon et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,768,348 B2 | 7/2014 | Stuempert et al. |
| 8,897,805 B2 | 11/2014 | Fix et al. |
| 8,909,247 B2 | 12/2014 | Tipton et al. |
| 8,923,134 B2 | 12/2014 | Meredith et al. |
| 8,929,827 B2 | 1/2015 | Fix et al. |
| 9,008,684 B2 | 4/2015 | Tipton et al. |
| 9,008,698 B2 | 4/2015 | Meredith et al. |
| 9,066,227 B2 | 6/2015 | Spencer et al. |
| 9,232,399 B2 | 1/2016 | Tipton et al. |
| 9,351,111 B1 | 5/2016 | Kaufman et al. |
| 9,667,660 B2 | 5/2017 | Tipton et al. |
| 10,084,824 B2 | 9/2018 | Tipton et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |

(56) References Cited

U.S. PATENT DOCUMENTS

| | | |
|---|---|---|
| 2003/0092448 A1 | 5/2003 | Forstrom et al. |
| 2003/0095065 A1 | 5/2003 | Ericson et al. |
| 2003/0097330 A1* | 5/2003 | Hillmer ............... G06Q 20/206 705/38 |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0043037 A1 | 2/2005 | Ioppe et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0143292 A1 | 6/2006 | Taubenheim et al. |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowly et al. |
| 2006/0276168 A1 | 12/2006 | Fuller, Jr. et al. |
| 2006/0282660 A1* | 12/2006 | Varghese ............. G06Q 20/341 713/155 |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1* | 9/2007 | Fujiwara ............... G01S 5/0205 370/338 |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0063030 A1 | 3/2009 | Howarter et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0161599 A1 | 6/2009 | Haartsen et al. |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1* | 12/2009 | Carlson ................. G06Q 20/04 705/44 |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0163632 A1 | 7/2010 | Tseng |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0313157 A1 | 10/2010 | Carlsson et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0028129 A1 | 2/2011 | Hutchison et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077030 A1 | 3/2011 | Wigren et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |

(56) References Cited

U.S. PATENT DOCUMENTS

| | | |
|---|---|---|
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1* | 2/2012 | Newman ............. G06Q 40/00 705/35 |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0069386 A1 | 3/2012 | St. Laurent et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0144452 A1 | 6/2012 | Dyor et al. |
| 2012/0144457 A1 | 6/2012 | Counterman |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0221232 A1 | 8/2012 | Shang et al. |
| 2012/0253656 A1 | 10/2012 | Brandt |
| 2012/0276900 A1 | 11/2012 | Stephens et al. |
| 2012/0282924 A1 | 11/2012 | Tagg et al. |
| 2012/0286997 A1 | 11/2012 | Lin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0122863 A1 | 5/2013 | Chen et al. |
| 2013/0137464 A1 | 5/2013 | Kramer et al. |
| 2013/0150053 A1 | 6/2013 | Hwang et al. |
| 2013/0226451 A1 | 8/2013 | O'Neill et al. |
| 2013/0267242 A1 | 10/2013 | Curticapean et al. |
| 2013/0281111 A1 | 10/2013 | Syrjarinne et al. |
| 2013/0288704 A1 | 10/2013 | Wirola et al. |
| 2013/0310075 A1 | 11/2013 | Lim et al. |
| 2013/0324149 A1 | 12/2013 | Fix et al. |
| 2013/0337824 A1 | 12/2013 | Meredith et al. |
| 2013/0337826 A1 | 12/2013 | Fix et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |
| 2014/0295881 A1 | 10/2014 | Werner et al. |
| 2014/0365488 A1 | 12/2014 | Arslan et al. |
| 2015/0011249 A1 | 1/2015 | Siliski et al. |
| 2015/0098712 A1 | 4/2015 | Li et al. |
| 2017/0280317 A1 | 9/2017 | Tagg et al. |

FOREIGN PATENT DOCUMENTS

| | | |
|---|---|---|
| JP | 2004069609 A | 3/2004 |
| JP | 2005091303 A | 4/2005 |
| JP | 2007328050 A | 12/2007 |
| WO | WO2006031035 A1 | 3/2006 |

OTHER PUBLICATIONS

Notice of Allowance dated Aug. 21, 2014 for U.S. Appl. No. 13/447,069, 78 pages.

Office Action dated Aug. 28, 2014 for U.S. Appl. No. 13/526,988, 83 pages.

Office Action dated Sep. 22, 2014 for U.S. Appl. No. 13/175,199, 62 pages.

Office Action dated Oct. 17, 2014 for U.S. Appl. No. 13/204,535, 47 pages.

Office Action dated Oct. 20, 2014 for U.S. Appl. No. 13/494,959, 64 pages.

Office Action dated Oct. 22, 2014 for U.S. Appl. No. 13/557,425, 59 pages.

Office Action dated Aug. 11, 2014 for U.S. Appl. No. 14/279,176, 22 pages.

Office Action dated Nov. 14, 2014 for U.S. Appl. No. 13/277,595, 74 pages.

Notice of Allowance dated Nov. 20, 2014 for U.S. Appl. No. 13/866,909, 27 pages.

Notice of Allowance dated Dec. 9, 2014 for U.S. Appl. No. 12/958,146, 48 pages.

Office Action dated Dec. 11, 2014 for U.S. Appl. No. 13/447,072, 28 pages.

Office Action dated Dec. 1, 2014 for U.S. Appl. No. 13/495,756, 76 pages.

Office Action dated Jan. 7, 2015 for U.S. Appl. No. 13/557,425, 30 pages.

Notice of Allowance dated Jan. 21, 2015 for U.S. Appl. No. 13/495,391, 98 pages.

Notice of Allowance dated Feb. 6, 2015 for U.S. Appl. No. 13/204,535, 20 pages.

Office Action dated Feb. 13, 2015 for U.S. Appl. No. 14/516,286, 62 pages.

Office Action dated Feb. 13, 2015 for U.S. Appl. No. 13/188,136, 44 pages.

Girardin, et al., "Digital footprinting: Uncovering tourists with user generated content." Pervasive Computing, IEEE 7.4, Oct.-Nov. 2008. 8 pages.

Steinfield, "The development of location based services in mobile commerce." ELife after the Dot Com Bust. PhysicaVerlagHD, 2004. 15 pages.

Sevtsuk, et al., "Does urban mobility have a daily routine? Learning from the aggregate data of mobile networks." Journal of Urban Technology, vol. 17, No. 1, Apr. 2010: 20 pages.

Buhalis, et al., "Information communication technology revolutionizing tourism." Tourism Recreation Research, vol. 30, No. 3, 2005. 10 pages.

Ratti, et al. "Mobile Landscapes: using location data from cell phones for urban analysis." Environment and Planning B: Planning and Design, vol. 33, 2006, 23 pages.

Office Action dated Apr. 16, 2015 for U.S. Appl. No. 14/521,431, 82 Pages.

Notice of Allowance dated Mar. 19, 2015 for U.S. Appl. No. 13/494,959, 41 Pages.

Notice of Allowance dated Mar. 26, 2015 for U.S. Appl. No. 14/276,688, 75 pages.

Office Action dated May 1, 2015 for U.S. Appl. No. 13/557,425, 33 pages.

Office Action dated May 14, 2015 for U.S. Appl. No. 14/530,605, 72 pages.

(56) References Cited

OTHER PUBLICATIONS

Office Action dated Jun. 1, 2015 for U.S. Appl. No. 13/447,072, 38 pages.
Office Action dated Jun. 2, 2015 for U.S. Appl. No. 14/516,286, 20 pages.
Office Action dated May 20, 2015 for U.S. Appl. No. 13/526,988, 52 pages.
Office Action dated Jun. 9, 2015 for U.S. Appl. No. 13/495,756, 35 pages.
Office Action dated Sep. 30, 2016 for U.S. Appl. No. 14/957,525, 72 pages.
Notice of Allowance dated Oct. 7, 2016 for U.S. Appl. No. 14/548,901, 45 pages.
Office Action dated Oct. 12, 2016 for U.S. Appl. No. 14/877,915, 34 pages.
Notice of Allowance dated Nov. 16, 2016 for U.S. Appl. No. 15/186,410, 80 pages.
Office Action dated Dec. 28, 2016 for U.S. Appl. No. 13/447,072, 34 pages.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21 st century dictionary. Retrieved on May 9, 2014 from http://search.credoreference.com/content/entry/chambdict/represent/O.
Represent. (2011). In The american heritage dictionary of the english language. Retrieved on May 9, 2014 from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Final Office Action dated Apr. 3, 2014 for U.S. Appl. No. 13/188,295, 37 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Jun. 12, 2017 for U.S. Appl. No. 15/132,220, 25 pages.
Notice of Allowance dated May 8, 2017 for U.S. Appl. No. 15/466,853, 18 pages.
Notice of Allowance dated May 19, 2017 for U.S. Appl. No. 15/261,841, 83 pages.
Office Action dated Jun. 19, 2017 for U.S. Appl. No. 13/447,072, 47 pages.
Office Action dated Jul. 5, 2017 for U.S. Appl. No. 15/191,877, 32 pages.
Office Action dated Jul. 25, 2017 for U.S. Appl. No. 15/422,147, 86 pages.
Notice of Allowance dated Jul. 8, 2015 for U.S. Appl. No. 14/548,901, 125 pages.
Buford, et al., Location Privacy Enforcement in a Location-Based Services Platform, IEEE, 2009, 978-1-4244-2309-5/09/$25.00 © 2009 IEEE. Retrieved on Jul. 29, 2015, 5 pages.
Philips, Jr. et al., Information Sharing and Security in Dynamic Coalitions, ACM, 2002. Retrieved on Jul. 29, 2015, 10 pages.
Moniruzzaman, et al., "A Study of Privacy Policy Enforcement in Access Control Models", Proceedings of 13th International Conference on Computer and Information Technology (ICCIT 2010), © 2010 IEEE. Retrieved on Jul. 29, 2015, 6 pages.
Office Action dated Jul. 22, 2015 for U.S. Appl. No. 13/188,136, 31 Pages.
"CELL_DCH", in INACON Glossary, published online at [http://www.inacon.de/glossary/CELL_DCH.php] retrieved on Jul. 22, 2015, 1 page.
Office Action dated Sep. 17, 2015 for U.S. Appl. No. 13/495,756, 23 Pages.
Office Action dated Sep. 14, 2015 for U.S. Appl. No. 13/557,425, 32 Pages.
Office Action dated Sep. 18, 2015 for U.S. Appl. No. 14/641,247, 69 Pages.
Office Action dated Jan. 13, 2017 for U.S. Appl. No. 14/601,800, 95 pages.
Office Action dated Jan. 26, 2017 for U.S. Appl. No. 14/877,915, 20 pages.
Office Action dated Feb. 14, 2017 for U.S. Appl. No. 14/641,242, 120 pages.
Office Action dated Feb. 15, 2017 for U.S. Appl. No. 15/191,877, 104 pages.
Office Action dated Feb. 27, 2017 for U.S. Appl. No. 15/132,220, 91 pages.
Notice of Allowance dated Apr. 10, 2017 for U.S. Appl. No. 14/676,066, 33 pages.
Office Action dated Aug. 24, 2017 for U.S. Appl. No. 14/881,335, 125 pages.
Office Action dated Oct. 4, 2017 for U.S. Appl. No. 15/235,502, 80 pages.
Office Action dated Sep. 28, 2017 for U.S. Appl. No. 15/344,468, 107 pages.
Office Action dated Sep. 28, 2017 for U.S. Appl. No. 15/132,220, 29 pages.
Office Action dated Oct. 18, 2017 for U.S. Appl. No. 15/629,366, 131 pages.
Office Action dated Oct. 16, 2017 for U.S. Appl. No. 15/131,793, 84 pages.
Notice of Allowance dated Aug. 16, 2017 for U.S. Appl. No. 14/877,915, 63 pages.
Notice of Allowance dated Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.

(56) References Cited

OTHER PUBLICATIONS

Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
MySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN Iu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary? doi=10.1.1.21.3818. Last accessed Dec. 24, 2010, 9 pages.
Hsu, et al. A Practical Guide to Support Vector Classification. Department of Computer Science National Taiwan University, Last

(56) References Cited

OTHER PUBLICATIONS updated: Apr. 15, 2010.http://www.csie.ntu.edu.tw/~cjlin/papers/guide/guide.pdf. Last accessed Dec. 24, 2010, 16 pages.
"Drucker, et al. Support Vector Regression Machines.http://scholar.google.com/scholar?q=%22Support+Vector+Regression+Machines.%22. Last accessed Dec. 24, 2010, 7 pages."
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system. Retrieved on Aug. 15, 2011, 7 pages.
Koukoumidis, et al., "SignalGuru: Leveraging Mobile Phones for Collaborative Traffic Signal Schedule Advisory." MobiSys'11, Jun. 28-Jul. 1, 2011, Bethesda, Maryland, USA, Copyright 2011 ACM 978-1-4503-0643-0/11/06. Retrieved on Nov. 19, 2011, 14 pages.
Bitcarrier Technology. Published online at http://www.bitcarrier.com/technology. Retrieved on Aug. 15, 2011, 1 page.
Hao, et al., "Estimating Vehicle Position in a Queue at Signalized Intersections Using Simple Travel Times from Mobile Sensors." Retrieved on Nov. 19, 2011, 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 21, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Office Action dated Jun. 10, 2016 for U.S. Appl. No. 14/548,901, 33 pages.
Office Action dated Jun. 22, 2016 for U.S. Appl. No. 14/970,533, 84 pages.
Office Action dated Jun. 28, 2016 for U.S. Appl. No. 15/132,220, 17 pages.
Notice of Allowance dated Jul. 19, 2016 for U.S. Appl. No. 14/952,609, 99 pages.
Office Action dated Aug. 24, 2016 for U.S. Appl. No. 14/676,066, 107 pages.
Office Action dated Aug. 25, 2016 for U.S. Appl. No. 13/447,072, 38 pages.
Office Action dated Mar. 11, 2016 for U.S. Appl. No. 14/743,076, 86 pages.
Notice of Allowance dated Mar. 16, 2016 for U.S. Appl. No. 14/520,287, 23 pages.
Office Action dated Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
Office Action dated May 17, 2016 for U.S. Appl. No. 15/074,622, 18 pages.
Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved from [http://search.credoreference.com/contententry/hmdictenglang/error/0] on Nov. 16, 2015.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action dated Nov. 30, 2015 for U.S. Appl. No. 13/447,072, 45 pages.
Office Action dated Dec. 18, 2015 for U.S. Appl. No. 14/548,901, 35 pages.
Office Action dated Dec. 31, 2015 for U.S. Appl. No. 14/952,609, 32 pages.
Office Action dated Dec. 1, 2015 for U.S. Appl. No. 13/526,988, 43 pages.

(56) References Cited

OTHER PUBLICATIONS

Office Action dated Jan. 11, 2016 for U.S. Appl. No. 13/175,199, 29 pages.
Notice of Allowance dated Aug. 27, 2015 for U.S. Appl. No. 14/521,431, 39 Pages.
Office Action dated Nov. 15, 2017 for U.S. Appl. No. 15/191,877, 30 pages.
Office Action dated Jan. 8, 2018 for U.S. Appl. No. 15/132,220, 30 pages.
Office Action dated Jan. 24, 2018 for U.S. Appl. No. 15/603,416, 99 pages.
Office Action dated Feb. 13, 2018 for U.S. Appl. No. 14/881,335, 54 pages.
Office Action dated Mar. 30, 2018 for U.S. Appl. No. 15/235,502, 14 pages.
Office Action dated Mar. 27, 2018 for U.S. Appl. No. 15/629,366, 23 pages.
Office Action dated May 11, 2018 for U.S. Appl. No. 15/132,220, 29 pages.
Office Action dated May 30, 2018 for U.S. Appl. No. 15/629,366, 30 pages.
Office Action dated May 31, 2018 for U.S. Appl. No. 15/603,421, 91 pages.
Office Action dated May 29, 2018 for U.S. Appl. No. 14/881,335, 63 pages.
Office Action dated Jun. 13, 2018 for U.S. Appl. No. 15/191,877, 33 pages.
Notice of Allowance dated May 21, 2018 for U.S. Appl. No. 15/344,468, 45 pages.
Office Action dated Nov. 27, 2018 for U.S. Appl. No. 15/629,366, 35 pages.
Non-Final Office Action dated Aug. 27, 2018 for U.S. Appl. No. 16/006,942, 24 pages.
Office Action dated Nov. 8, 2018 for U.S. Appl. No. 14/881,335, 68 pages.
Office Action dated Nov. 19, 2018 for U.S. Appl. No. 16/108,060, 27 pages.
Office Action dated Sep. 24, 2018 for U.S. Appl. No. 15/996,203, 21 pages.

\* cited by examiner

FRAUD ANALYSIS FOR A LOCATION AWARE TRANSACTION

RELATED APPLICATIONS

This application claims priority to, and is a continuation of, U.S. patent application Ser. No. 13/204,535 (now U.S. Pat. No. 9,053,513), filed 5 Aug. 2011, entitled "FRAUD ANALYSIS FOR A LOCATION AWARE TRANSACTION", which is hereby incorporated by reference in its entirety.

TECHNICAL FIELD

The disclosed subject matter relates to fraud analysis technologies and, more particularly, to fraud analysis for location aware transactions.

BACKGROUND

Conventionally, location aware fraud detection has relied on a payment method being collocated with an identified mobile phone. As such, when a customer places an order, the vendor, e.g., the bank issuing the credit card used in the transaction, can check the location of a phone associated with the vendor account. By checking the location of the mobile phone, it can be assumed that where the phone is close to the credit cards being used and where the phone is associated with the user issued the credit card, that the credit card is likely not being used fraudulently. Vendors can use these traditional systems to "verify" the identity of the financial card user by their proximity to the financial cards themselves. For example, where a party pays for movie tickets at a theatre by credit card, the credit card company can query the location of the mobile phone issued to the "party". Where the phone is collocated at the movie theatre, it can be deduced that the party using the credit cards is the authorized user. In contrast, where the phone is located in another city, it can be deduced that the party using the card is doing so fraudulently.

These conventional systems rely on associations between a user and a payment method, e.g., a credit/debit card. These systems can fail where a mobile phone is not owned by a vendor customer, e.g., there is no mobile phone to associate with a credit/debit card. Further, even where a mobile phone is associated with a vendor customer account, if the vendor customer doesn't bring the mobile phone with them, the verification system can fail even though there is no fraud occurring. Additionally, fraud often is associated with rapid use of a compromised vendor account, and conventional systems may be circumvented by registering a disposable or temporary mobile phone to a compromised account to circumvent the conventional fraud technology.

The above-described deficiencies of conventional location aware fraud detection is merely intended to provide an overview of some of problems of current technology, and are not intended to be exhaustive. Other problems with the state of the art, and corresponding benefits of some of the various non-limiting embodiments described herein, may become further apparent upon review of the following detailed description.

DETAILED DESCRIPTION

Figure 1:
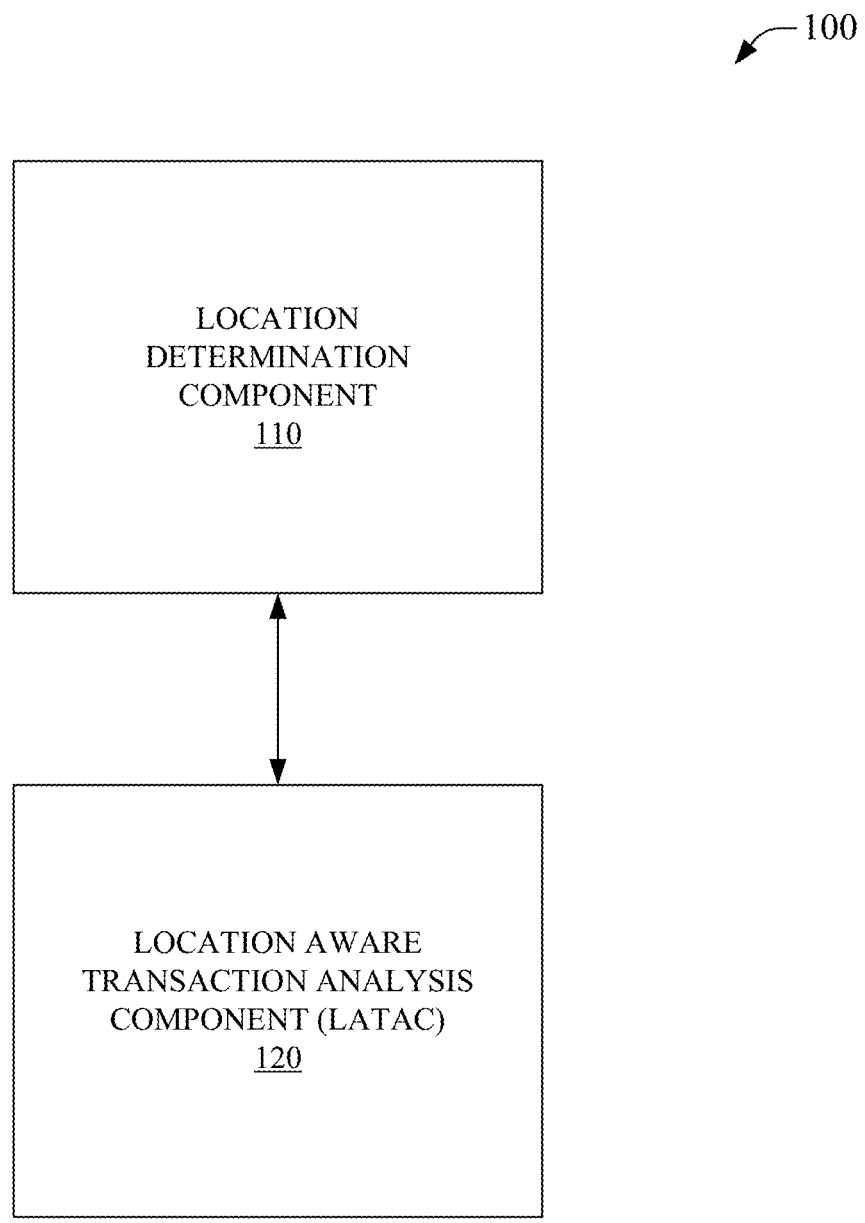
FIG. 1 is an illustration of a system that facilitates fraud analysis for a location aware transaction in accordance with aspects of the subject disclosure.

In contrast to conventional location aware fraud detection techniques or systems, the presently disclosed subject matter illustrates location aware fraud analysis leveraging historic fraud location information. As an example of fraudulent vendor account usage, credit cards can be stolen and used for remote electronic purchase transactions where the purchase items are sent to a mailbox center. The mailbox is set up under a fraudulent name and is used for a relatively short term and is then moved under yet a different name to another location to avoid law enforcement detection and intervention. The holder of the stolen credit card or credit information calls an electronic vendor who takes the credit card information and so long as the credit card has not yet been identified as stolen, the thief is able to get the item purchased and will typically pay for expedited delivery in hopes the item will ship immediately and arrive prior to the owner of the card learning of the theft. The same card may be used for many purchases in a short term. Often, such thieves can be part of a ring that may make these transactions from a common location using anonymous cell phones, e.g., temporary or disposable user equipment such as those made anonymous by use of prepaid SIM cards. Tracking the history of fraudulent transaction can indicate locations that are frequently associated with fraudulent activity. For example, a ring of thieves can use a home as a base of operations wherein multiple fraudulent activities are originated from user equipment located at or near the home. The multiple frauds can be detected and associated with the home such that future purchases from the home can be subject to heightened scrutiny.

In an aspect, location information for a UE can be employed to facilitate access to historical fraud information.

Historical fraud information can expressly include locations originating one or more fraudulent transactions. Historical fraud information can further include UE tracks. UE tracks can be a set of locations related to the transportation of a UE. For example, where a thief originates fraudulent transactions while walking between their home and place of work, the "UE track", e.g., path, between the home and place of work can be associated with the fraudulent activity. Further, the historical fraud information can be historical information from one or more UEs correlated with a set of locations, e.g., a single UE fraud history or the agglomerated fraud history of multiple UEs. Further, historical fraud information can be based on non-UE sources, such as a vendor or carrier explicitly designating a location as associated with fraud, designating a user equipment as associated with fraud, designating a user equipment track as associated with fraud, etc. User equipment location information can be based on nearly any form of location technology, including, global positioning system (GPS), enhanced GPS (eGPS), triangulation, multilateration, proximity sensing, timed fingerprint location (TFL), inertial sensing, dead reckoning, etc.

Various embodiments relate to fraud analysis for location aware transactions. In one example embodiment, a system comprises a location determination component to determine a location, the location facilitating receiving historical fraud information associated with the location. The exemplary system further comprises an analysis component to determine a value based on a condition relating to historical fraud information. This value can be determined based on the satisfaction of the condition. In some embodiments, weighting factors can be employed in determining the value as disclosed hereinbelow.

In another example embodiment, a method comprises receiving location information for user equipment. The example method further comprises receiving fraud history information based on the location of the user equipment. Based on the fraud history information, the method can further comprise determining a value. In some embodiments, the value can reflect the likelihood of fraud occurring for transactions associated with user equipment at the location based on previous fraudulent activity occurring at or near the location.

In another example embodiment, a computing device comprises a processor configured to receive an equipment identifier for user equipment. The processor can further receive a transaction identifier. Further, location information for the user equipment can be received. The processor can further receive historical fraud information related to the location information and can determine a fraud factor value. The fraud factor value can be associated with the transaction identifier. Moreover, the processor can be configured to facilitate access to the fraud factor and the transaction identifier.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates fraud analysis for a location aware transaction in accordance with aspects of the subject disclosure. System 100 can include location determination component 110. Location determination component 110 can facilitate access to location information. Location information can be based on nearly any form of location technology, including, GPS, enhanced GPS (eGPS), triangulation, multilateration, proximity sensing, TFL, inertial sensing, etc. For example, a location can be determined from a GPS component of a UE. As a second example, a TFL component of a UE can provide a location.

System 100 can further include location aware transaction analysis component (LATAC) 120. LATAC 120 can facilitate detecting fraudulent activity based on UE location information. A location aware transaction (LAT) can be a transaction in which location information can be associated with the transaction. In an aspect, a LAT can be associated with transaction origination location information, transaction delivery location information, transaction equipment location information, etc. For example, a LAT can be associated with an "ordering address", a "delivery address", and the location of user equipment employed in the transaction. This location information can be redundant, for example, where the ordering address, the delivery address, and the location of a tablet computer used to place the order are all the same location.

LATAC 120 can receive location information from location determination component 110 related to the location of UE. As such, LATAC 120 can be a source of information for a LAT, e.g., by sourcing the location information for a UE associated with the LAT. Further, LATAC 120 can determine a value for a fraud factor based on location information received from location determination component 110. A fraud factor can be a metric of the likelihood of fraudulent activity. For example, where a UE is located at a location historically associated with hundreds of previous fraudulent activities while surrounding areas have no historical fraudulent activity, the fraud factor can be associated with a value reflecting a high likelihood of fraud. In contrast, where the UE is located at a location historically associated with hundreds of previous fraudulent activities but surrounding areas have similar or higher levels of fraudulent activity, the fraud factor can be associated with a value reflecting an average likelihood of fraud. A fraud factor can be used alone or in conjunction with other fraud metrics in forming a final determination of the likelihood of fraud. For example, the fraud factor can be employed in conjunction with personal identification numbers (PINs), credit card verification (CCV) numbers, billing address verification, etc.

In an embodiment, system 100 can facilitate analysis of fraud based on the location of a UE associated with a LAT. For example, a transaction can be originated from a UE. Identifiers for the UE can be received as part of the transaction. UE identifiers can include a subscriber identity module (SIM) number, an electronic serial number (ESN), a mobile identification number (MIN), an international mobile equipment identity (IMEI) number, etc. Wireless carrier networks can access location information for identified UEs, such as by multilateration, affiliation with a NodeB, or TFL location information. Further, location information can be received from the UE, for example, GPS or eGPS. As such, the transaction can be considered a LAT. The location of the UE can be checked against historical location centric fraud information. Where a UE is located at or near a location associated with fraud, the likelihood of fraud for the instant transaction can increase. Conversely, where the UE is located in a location not historically associated with fraud, the likelihood of fraud for the instant transaction can decrease.

In an aspect, the location of the UE associated with the transaction can be employed to expand a location centric fraud data set. The transaction can be logged and later updated if the transaction becomes associated with a fraud. For example, on June 21 a transaction can be placed by a cell phone associated with 123 Main St., based on UE location information. The transaction can be stored in a location centric fraud database. On July 26, the transaction can be flagged as fraudulent when a vendor customer calls to complain that fraudulent activity, including the transaction associated with 123 Main St., is appearing on their credit card statement. The record for the transaction at 123 Main St. can then be updated in the location centric fraud database. Thus, future transactions occurring from 123 Main St. can access the fraud history for the June 21 transaction. The occurrence of fraud activity at 123 Main St. on June 21 can be considered relevant in determining a fraud factor value, e.g., by way of LATAC 120, for a predetermined period. The period can be, for example, six months, 2 years, 10 years, etc. Further, the relevant period can be event driven, for example, the June 21 fraud event can be relevant until public records show a sale of the home at 123 Main St., etc.

Associating historical fraudulent activity with locations can facilitate fraud detection that is independent of a UE associated with the transaction. In an aspect, where 123 Main St. is associated with historical fraud activity, it is the location 123 Main St. that is associated with the fraud such that any future transaction associated with 123 Main St. can be considered at an increased risk of fraud. Thus, where a thief switches between several stolen phones and uses prepaid SIM cards to obfuscate the ownership of the phone in regard to the transaction, the use of each of these phones from 123 Main St. can be cause for a fraud factor score indicative of a high risk of fraudulent activity. Similarly, where several thieves use a "home base", the fraudulent activity of one thief at the "home base" location can reduce the likelihood that the other thieves can continue their fraudulent activity at the same location.

Of note, a location can be associated with an address, e.g., 123 Main St., however, the location can just as easily be in other forms. A location can be an address, a GPS time stamp set, bin grid array location, longitude and latitude, etc. Further, a location can be two-dimensional or three-dimensional, for example, a location can be a floor number of an office building, an apartment identified by longitude/latitude/elevation, etc.

Figure 2:
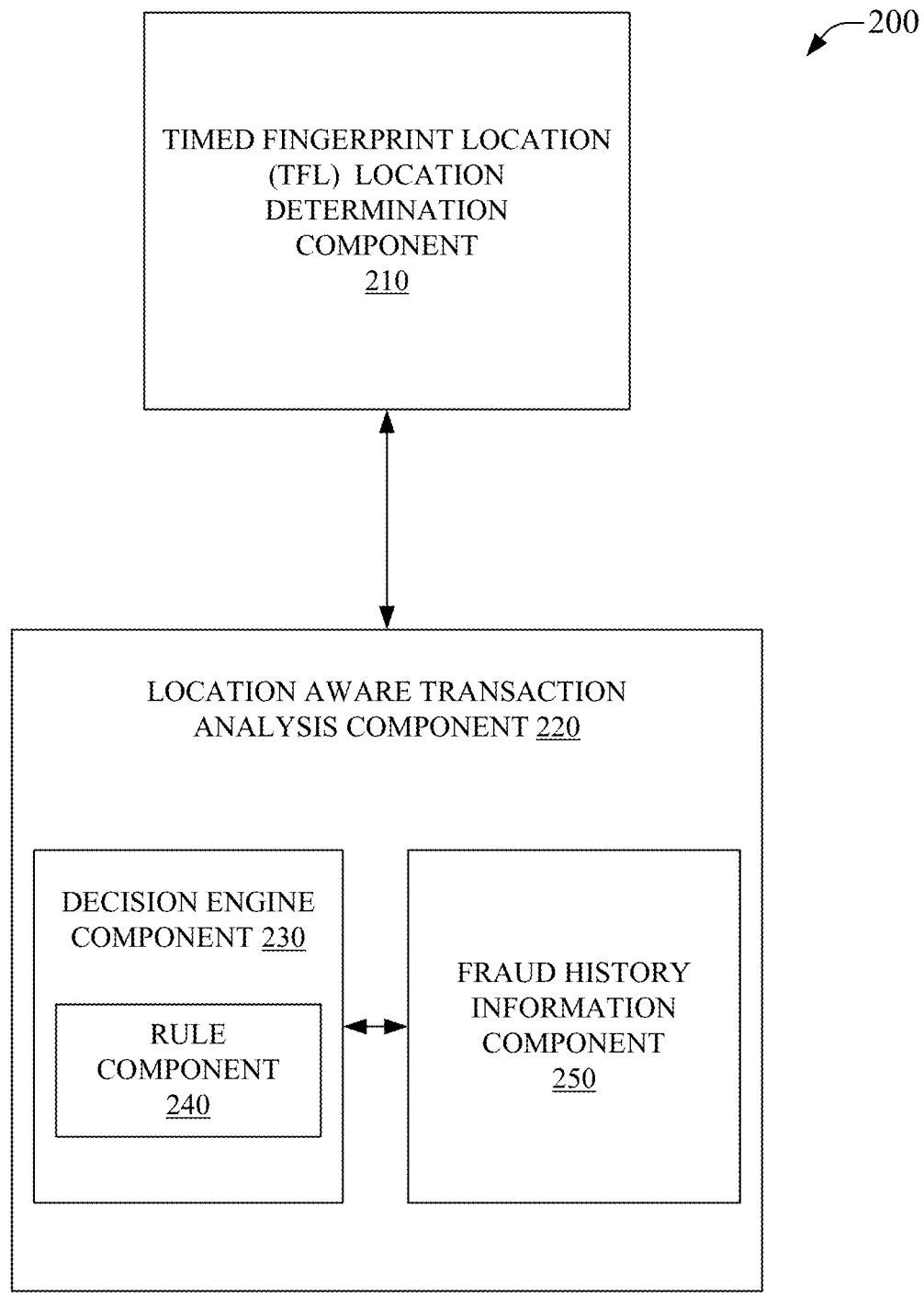
FIG. 2 is a depiction of a system that facilitates fraud analysis with timed fingerprint location technology for a location aware transaction in accordance with aspects of the subject disclosure.

FIG. 2 is a depiction of a system 200 that can facilitate fraud analysis with timed fingerprint location technology for a location aware transaction in accordance with aspects of the subject disclosure. System 200 can include TFL location determination component 210. TFL location determination component 210 can facilitate access to TFL location information. TFL information can be a source of location information for UEs. Moreover, TFL information can be employed at various levels of granularity. Further, TFL information can be employed with little to no additional power consumption. TFL information can provide advantages over GPS-type techniques, near field communication techniques, or proximity sensor techniques and is distinct from these other forms of location determination.

TFL information can include location or timing information. As such, TFL location determination component 210 can facilitate access to location information for a UE and TFL information can be information from systems in a timed fingerprint location wireless environment, such as a TFL component of a wireless telecommunications carrier. As a non-limiting example, a mobile device, including mobile devices not equipped with a GPS-type system, can be located by looking up timing information associated with the mobile device from a TFL information reference.

In an aspect, TFL information can include information to determine a differential value for a NodeB site pair and a bin grid frame. A centroid region (possible locations between any site pair) for an observed time value associated with any NodeB site pair (NBSP) can be calculated and is related to the determined value (in units of chip) from any pair of NodeBs. When UE time data is accessed, a value look-up can be initiated (e.g., a lookup for "DV(?,X)"). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors.

System 200 can further include LATAC 220. LATAC 220 can be communicatively coupled to TFL location determination component 210. LATAC 220 can facilitate the analysis TFL location information in determining a fraud factor value. LATAC 220 can include decision engine component 230.

Decision engine component 230 of system 200 can facilitate forming determinations relating to a fraud analysis rule. Determinations can include satisfying a fraud analysis rule, not satisfying a fraud analysis rule, satisfying part of a fraud analysis rule, applying a fraud analysis rule to a set of information, etc. A determination relating to a fraud analysis rule can be related to location information, including TFL location information. For example, where a fraud analysis rule is satisfied when a UE location is the same as a historic fraud location, decision engine component 230 can determine is this rule is satisfied by comparing a TFL location for a UE with a set of historical fraud locations. As a further example, decision engine component 230 can apply a weighting rule to location information and historical fraud information, such as where a rule indicates that a weighting factor of ½× is to be applied to historical fraud over one year old. Moreover, decision engine component 230 can apply a fraud analysis rule to a set of information that includes non-location information, for example, where the SIM has been activated in the last 48-hours a weighting factor of 2× should be applied. Numerous other examples of specific rules are not explicitly recited for brevity but are to be considered within the scope of the present disclosure.

In an aspect, decision engine component 230 can include rule component 240 to facilitate forming determinations related to a fraud analysis rule. Rule component 240 can facilitate employing one or more fraud analysis rules. These rules can include, rules for determining a fraud factor value, determining a value employed in determining a fraud factor value, applying weighting, inclusion or exclusion of historical fraud activity, determining the scope of a relevant region around a location, etc. In an embodiment, rule component 240 can be a rule engine that allows the application of logical determinations to be embodied in one or more algorithms related to the analysis of a fraud analysis rule. As a non-limiting example, rule component 240 can generate a rule that alters a weighting of a historical fraud activity based on the age of the historical fraud activity. As a second non-limiting example, rule component 240 can generate a rule that determines a region to be included in a UE track, a region around a rural property, a region around an urban property, etc. As a third non-limiting example, rule component 240 can receive a rule that selects target historical fraud data sets to be included in an analysis, e.g., a Kansas data set can be accessed for UE locations identified in Kansas, a Canadian data set can be selected for UE locations in Alberta, etc.

In other embodiments, rule component 240 can directly apply predetermined rules to fraud analysis. For example, rule component 240 can apply a weighting rule that amplifies fraud activities where the UE has recently been activated with a wireless carrier. As a second example, rule component 240 can apply a predetermined rule that excludes entire regions, such as prohibiting transactions in Canada. Further explicit examples are not provided for brevity but all such examples are to be considered within the scope of the present disclosure.

System 200 can further include fraud history information component 250. Fraud history information component 250 can facilitate receiving historical fraud information. Fraud history information component 250 can include local, remote, or distributed data stores. For example, fraud history information component 250 can facilitate access to historic fraud resource information from a financial institution database, e.g., a vendor supplied location centric fraud database. As a second example, fraud history information component 250 can facilitate access to historic fraud data on a wireless carrier database. Similarly, fraud data can be distributed, e.g., cloud based. Fraud history information component 250 can be communicatively coupled to decision engine component 230 of LATAC 220 to facilitate determining a value for a fraud factor based on historical fraud information and the location of a UE.

Figure 3:
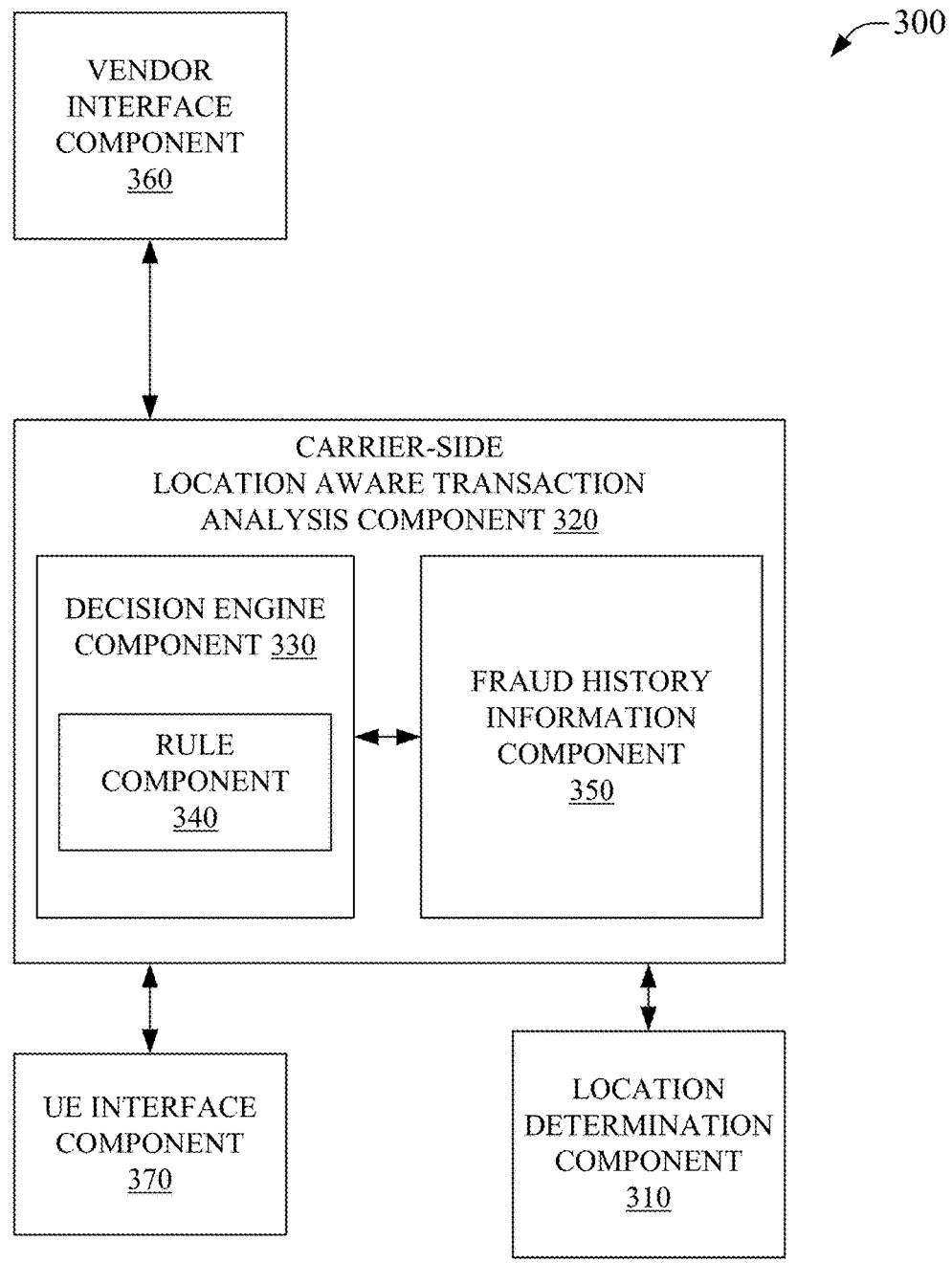
FIG. 3 illustrates a system that facilitates carrier-side fraud analysis for a location aware transaction in accordance with aspects of the subject disclosure.

FIG. 3 illustrates a system 300 that facilitates carrier-side fraud analysis for a location aware transaction in accordance with aspects of the subject disclosure. System 300 can include location determination component 310. Location determination component 310 can facilitate access to location information. Location determination component 310 can be communicatively coupled to carrier-side LATAC 320. Carrier-side LATAC 320 can facilitate detecting fraudulent activity based on UE location information. In an aspect, carrier-side LATAC 320 can be embodied on equipment associated with a wireless carrier. This equipment can include core network components, radio area networks (RANs), NodeBs, etc.

Carrier-side LATAC 320 can include decision engine component 330 that can facilitate forming determinations relating to a fraud analysis rule. Decision engine component 330 can include rule component 340 to facilitate employing one or more fraud analysis rules. Further, decision engine 330 can be communicatively coupled to Fraud history information component 350. Fraud history information component 350 can facilitate receiving historical fraud information. Fraud history information component 350 can include local, remote, or distributed data stores including fraud data and other historical information related to fraud analysis.

System 300 can further include vendor interface component 360. In this context, a vendor is a provider of financial services related to a transaction and includes credit card financial service providers, debit card financial service providers, electronic banking service providers, electronic commerce companies providing financial services such as PayPal, etc. Vendor interface component 360 can facilitate interaction with vendor systems. For example, vendor interface component 360 can facilitate a communicative coupling between a credit card provider and carrier-side LATAC 320 to facilitate communications germane to approving a present transaction for which location aware fraud analysis is appropriate. The exemplary credit card provider can supply carrier-side LATAC 320 with a UE identifier by way of vendor interface component 360. Carrier-side LATAC 320 can facilitate access by the exemplary credit card company to a determined fraud factor by way of vendor interface component 360. Further, rule component 340 can access vendor specific rules from the exemplary credit card company by way of vendor interface component 360. Numerous other examples of interaction between a vendor system and carrier-side LATAC 320 by way of vendor interface component are not explicitly recited for brevity but are to be considered within the scope of the disclosed subject matter.

System 300 can further include UE interface component 370. UE interface component 370 can facilitate interaction between carrier-side LATAC 320 and a UE. For example, carrier-side LATAC 320 can receive location information, subscriber information, identifiers, usage history, etc. from a UE by way of UE interface component 370.

In an aspect, system 300 illustrates location of many of the components on the carrier-side as compared to the vendor-side or UE-side. This can be useful in that typically the computing g power available at a wireless carrier will be substantially greater than that located in UE associated with the wireless carrier. Of note, location determination component 310 can be located independently, carrier-side or UE-side.

In a further aspect, system 300 limits exposure of personal information of wireless carrier subscribers from being shared with vendors. System 300 can process fraud analysis for LATs by receiving a request for the analysis form a vendor by way of vendor interface component 360. The request can be associated with a request identifier (not illustrated) and a UE identifier. Of note, the UE identifier need not be directly correlated with personal information of a wireless subscriber associated with the UE, for example, a unique number can be convolved on a UE for a LAT and can be given to a vendor who, in turn, can provide it to the carrier-side LATAC 320 by way of vendor interface component 360. This number can be convolved to specifically provide privacy to the owner of the UE under the assumption that most transactions are not fraudulent. The number can be deconvolved at the carrier-side LATAC 320 to access wireless subscriber information and location information that can be employed in the fraud analysis. Thereafter, a fraud factor and the reconvolved number can be returned to the vendor by way of vendor interface component 360. Further, a fraud factor and request identifier can be made accessible to the vendor by way of vendor interface component 360, typically associating a specific transaction to the fraud factor without revealing personal information to the vendor. Of course, other non-convolved identifiers of the UE can also be employed, but this will typically be associated with the possibility of sharing personal information with a vendor.

Figure 4:
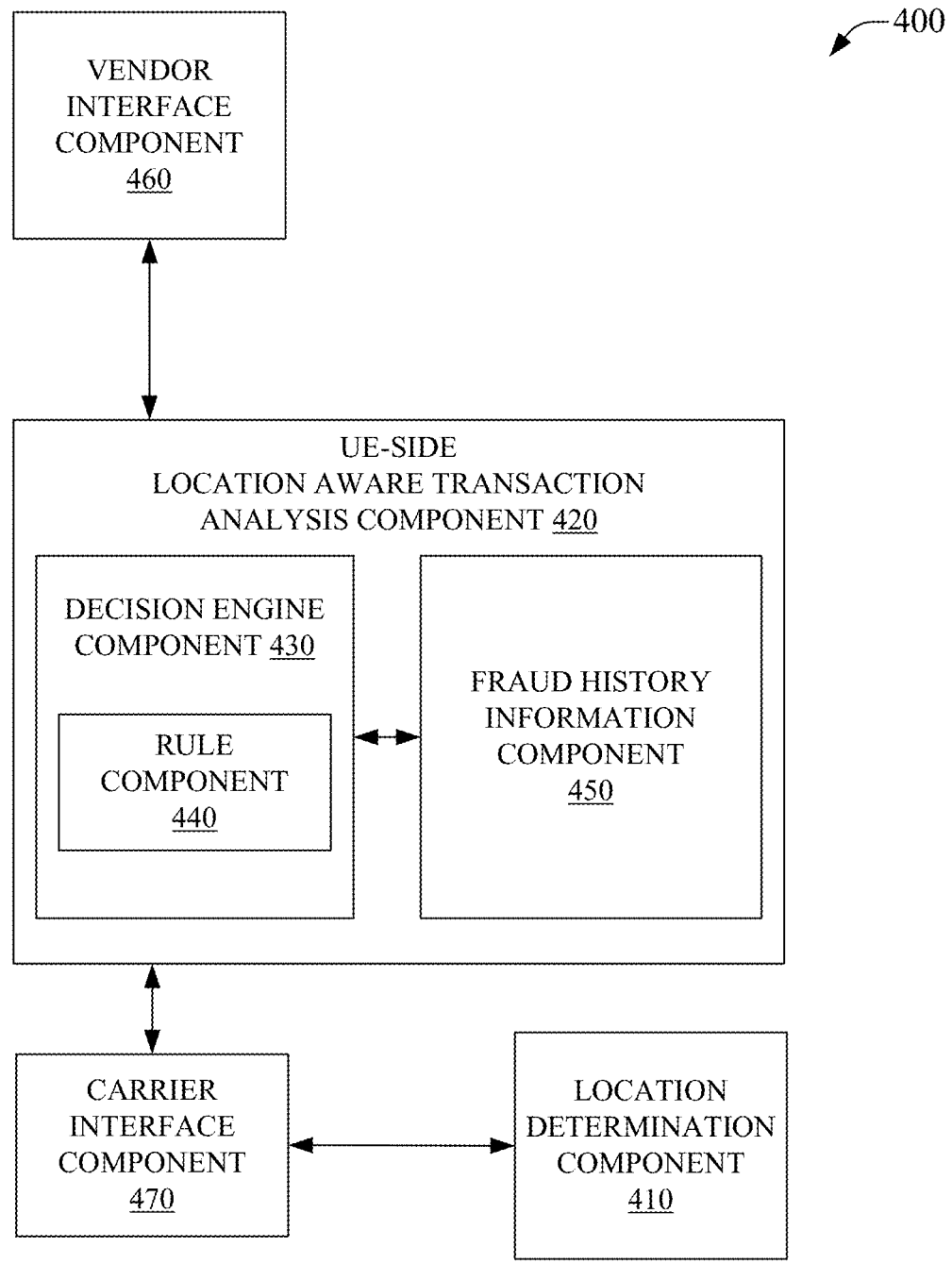
FIG. 4 is a depiction of a system that facilitates user equipment-side fraud analysis for a location aware transaction in accordance with aspects of the subject disclosure.

FIG. 4 is a depiction of a system 400 that facilitates user equipment-side fraud analysis for a location aware transaction in accordance with aspects of the subject disclosure. System 400 can include location determination component 410. Location determination component 410 can facilitate access to location information. Location determination component 410 can be communicatively coupled to UE-side LATAC 420. UE-side LATAC 420 can facilitate detecting fraudulent activity based on UE location information. In an aspect, UE-side LATAC 420 can be embodied on UE equipment associated with a relationship to a wireless carrier. UE equipment can include cell phones, smartphones, laptop computers, notebook computers, tablet computers, mobile broadband equipment (e.g., USB dongles or antennas), mobile hotspots, vehicle computers or vehicular computing systems, electronic books (e.g., Nook, Kindle, Sony eReader, etc.), GPS map devices, etc.

UE-side LATAC 420 can include decision engine component 430 that can facilitate forming determinations relating to a fraud analysis rule. Decision engine component 430 can include rule component 440 to facilitate employing one or more fraud analysis rules. Further, decision engine 430 can be communicatively coupled to fraud history information component 450. Fraud history information component 450 can facilitate receiving historical fraud information. Fraud history information component 450 can include local, remote, or distributed data stores related to fraud analysis.

System 400 can further include vendor interface component 460. Vendor interface component 460 can facilitate interaction with vendor systems. For example, vendor interface component 460 can facilitate a communicative coupling between a credit card provider and UE-side LATAC 420. UE-side LATAC 420 can facilitate access for the exemplary credit card company to a determined fraud factor by way of vendor interface component 460. Further, rule component 440 can access vendor specific rules from the exemplary credit card company by way of vendor interface component 460. Numerous other examples of interaction between a vendor system and UE-side LATAC 420 by way of vendor interface component are not explicitly recited for brevity but are to be considered within the scope of the disclosed subject matter.

System 400 can further include carrier interface component 470. Carrier interface component 470 can facilitate interaction between UE-side LATAC 420 and wireless carrier components in a manner similar to that of the vendor interface component 460 facilitating interaction with vendor-side components. For example, UE-side LATAC 420 can receive location information, subscriber information, identifiers, usage history, etc., from a carrier-side component by way of carrier interface component 470.

In an aspect, system 400 illustrates location of many of the components on the UE-side as compared to the vendor-side or carrier-side. This can be useful in that much of the fraud analysis can occur local to the UE. This does however expose portions of system 400 to parties in control of the UE in a manner that could allow of penetration of the fraud analysis. For example, where a fraudulent activity is occurring, it is likely that the fraudster has access to the UE. Where the fraudster can access the UE-side components there is the possibility that the benefits of the fraud analysis can be negated by way of hacking or other interaction with the UE-side components of system 400. Where suitable precautions are taken, these risks can be minimized and much of the processing associated with the fraud analysis can be distributed to the large plurality of UEs rather than being centralized at the carrier as in system 300 or with the vendor as in system 500. This can significantly reduce the computing load at carrier-side or vendor-side components.

In a further aspect, system 400 limits exposure of personal information associated with wireless carrier subscribers from being shared with vendors. System 400 can process fraud analysis for LATs by receiving a request for the analysis form a vendor by way of vendor interface component 460. The request can be associated with a request identifier (not illustrated). Of note, a UE identifier need not be communicated with the vendor. A fraud factor can be determined at UE-side LATAC 420, associated with the request identifier, and made accessible to the vendor by way of vendor interface component 460, typically associating a specific transaction to the fraud factor without revealing personal information to the vendor.

Figure 5:
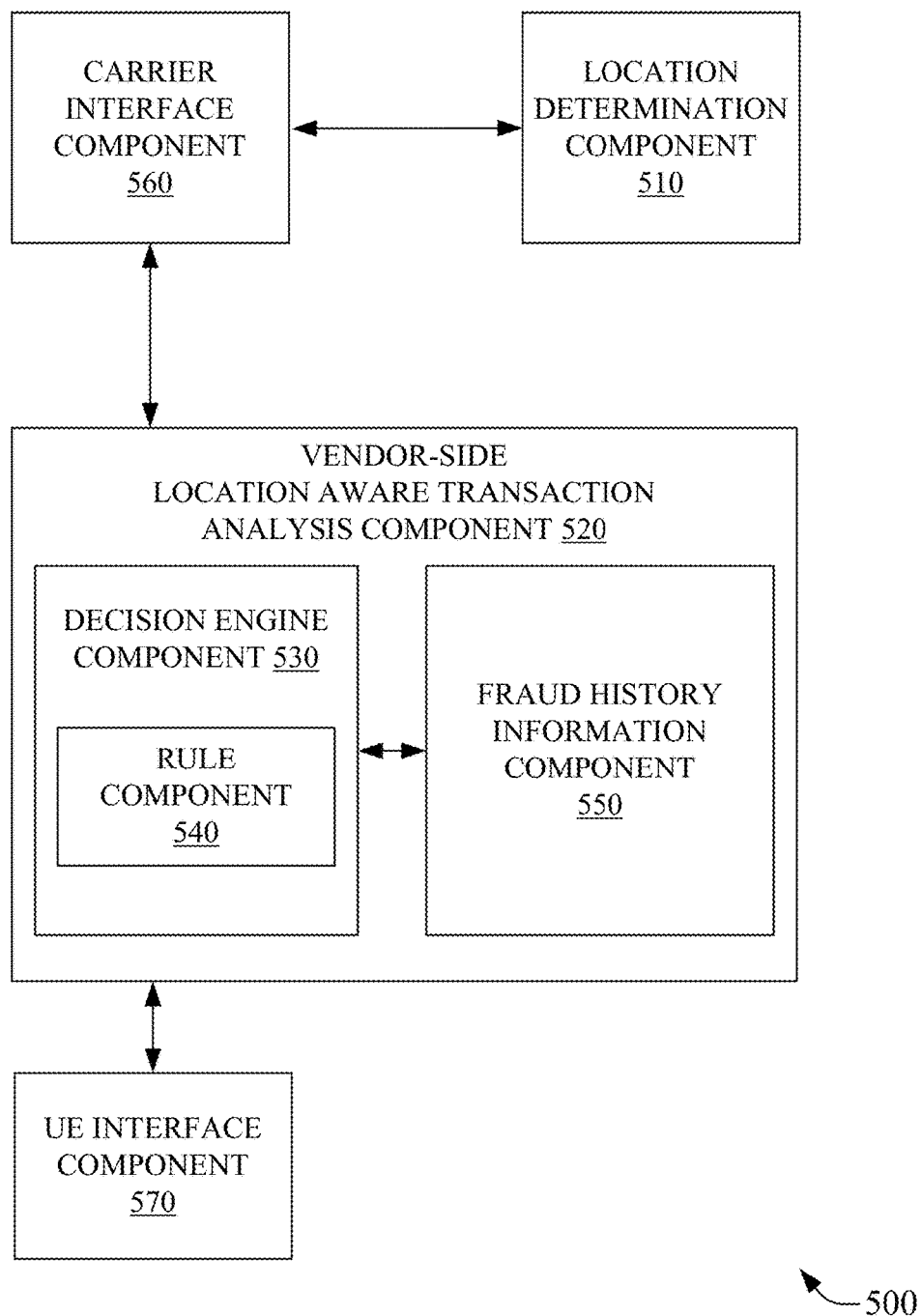
FIG. 5 is a depiction of a system that facilitates vendor-side fraud analysis for a location aware transaction in accordance with aspects of the subject disclosure.

FIG. 5 illustrates a system 500 that facilitates vendor-side fraud analysis for a location aware transaction in accordance with aspects of the subject disclosure. System 500 can include location determination component 510. Location determination component 510 can facilitate access to location information. Location determination component 510 can be communicatively coupled to vendor-side LATAC 520. Vendor-side LATAC 520 can facilitate detecting fraudulent activity based on UE location information. In an aspect, vendor-side LATAC 520 can be embodied on vendor-side equipment.

Vendor-side LATAC 520 can include decision engine component 530 that can facilitate forming determinations relating to a fraud analysis rule. Decision engine component 530 can include rule component 540 to facilitate employing one or more fraud analysis rules. Further, decision engine 530 can be communicatively coupled to fraud history information component 550. Fraud history information component 550 can facilitate receiving historical fraud information. Fraud history information component 550 can include local, remote, or distributed data stores related to fraud analysis.

System 500 can further include carrier interface component 560. Carrier interface component 560 can facilitate interaction with wireless carrier components and systems. For example, carrier interface component 560 can facilitate a communicative coupling between a wireless carrier and vendor-side LATAC 520. Vendor-side LATAC 520 can facilitate receiving location information, subscriber information, identifiers, usage history, etc., from a carrier-side component by way of carrier interface component 560. Numerous other examples of interaction between a wireless carrier and vendor-side LATAC 520 by way of carrier interface component are not explicitly recited for brevity but are to be considered within the scope of the disclosed subject matter.

System 500 can further include UE interface component 570. UE interface component 570 can facilitate interaction between vendor-side LATAC 520 and UE components. For example, vendor-side LATAC 520 can receive location information, subscriber information, identifiers, usage history, etc. from UE-side components by way of UE interface component 570.

In an aspect, system 500 illustrates location of many of the components on the vendor-side as compared to the UE-side or carrier-side. This can be useful in that much of the fraud analysis can occur local to the vendor who is typically an entity directly interested in the fraud analysis. System 500, however, can expose wireless carrier customer personal information to vendors. System 500 can process fraud analysis for LATs by receiving location information and/or identification information from a UE by way of UE interface component 560 and/or location determination component 510. A fraud factor can be determined directly at vendor-side LATAC 520. Although not illustrated, it is to be noted that location determination component 510 can be communicatively coupled to vendor-side LATAC 520 to facilitate receiving location information for a fraud analysis.

Of note, aspects of system 300, 400, and 500 can be selectively employed to create hybrid systems, not illustrated, which are considered to be within the scope of the presently disclosed subject matter. For example, a hybrid system can include a carrier-side LATAC but a vendor-side fraud history information component. AS a second example, a hybrid system can include a UE-side LATAC, a distributed decision engine component, and a carrier-side fraud history information component. Numerous other examples of hybrid systems within the scope of the presently disclosed subject matter are not expressly illustrated for brevity.

Figure 6:
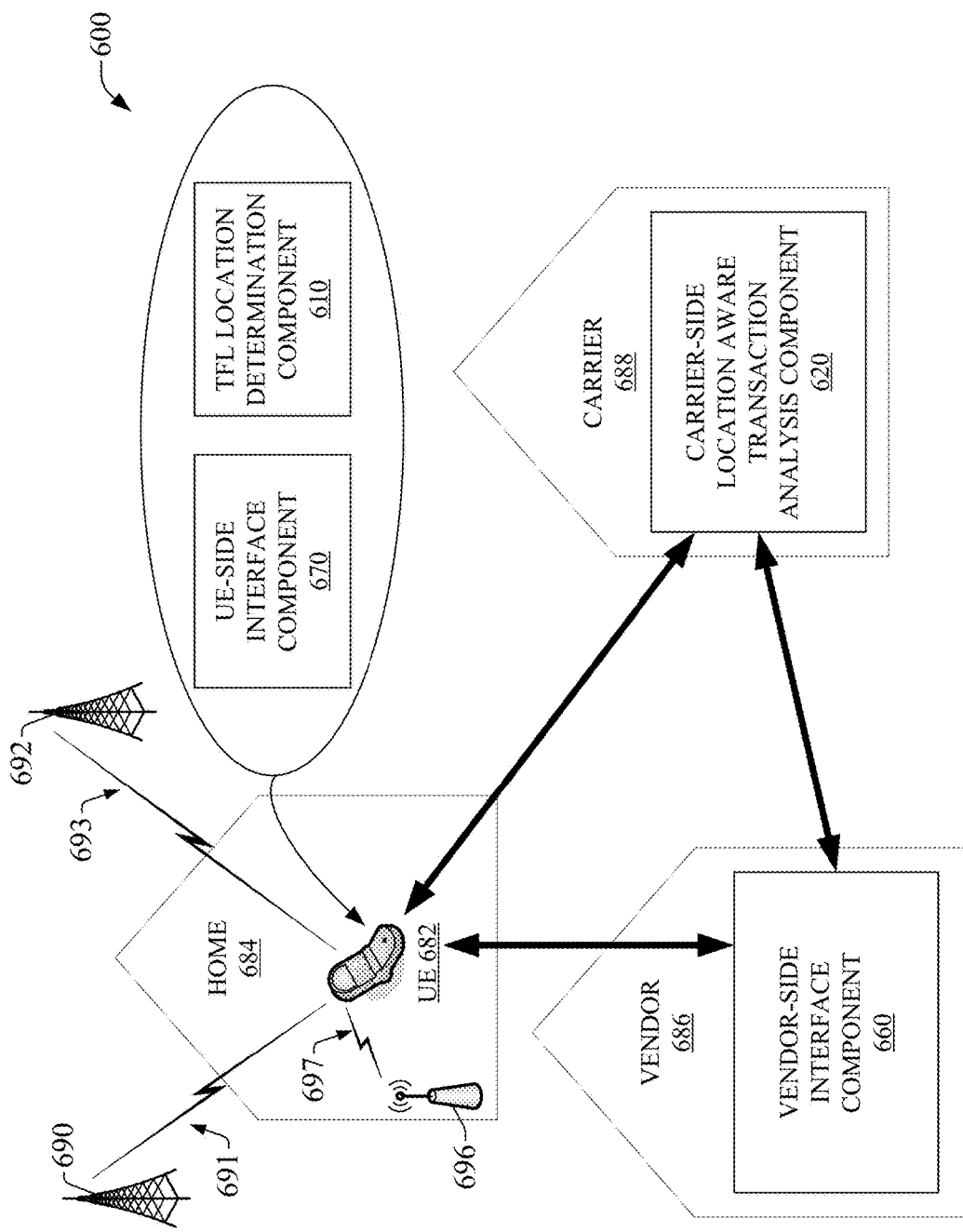
FIG. 6 illustrates a non-limiting exemplary system facilitating fraud analysis for a location aware transaction in accordance with aspects of the subject disclosure.

FIG. 6 illustrates a non-limiting exemplary system 600 facilitating carrier-side fraud analysis for a location aware transaction in accordance with aspects of the subject disclosure. System 600 can include UE 682 that can include TFL information component 610 and UE-side interface component 670. TFL information component 610 can facilitate determining the location of UE 682 based on TFL information as disclosed herein. UE-side interface component 670 can facilitate interaction between UE 682 and other components of system 600.

System 600 can further include NodeBs 690 and 692, and access point 696. Each of these NodeBs and/or access point can facilitate a communications link (e.g., 691, 693, and 697 respectively) with UE 682 as illustrated. Further, UE 682 can employ TFL information related to the timing of communications links, by way of TFL location determination component 610 to determine a location of UE 682 at home 684. Of note, access point 696 can be associated with a predetermined physical location such that when UE 682 is within range of access point 696, UE 682 can be considered to be at or near the predetermined location associated with access point 696. While this is not TFL location information, it can supplement TFL location information in a manner similar to supplementing TFL location information with GPS location information, etc.

System 600 can further include carrier 688. Carrier 688 can be a wireless carrier that can be equipped with carrier-side LATAC 620. Carrier-side LATAC 620 can facilitate detecting fraudulent activity based on UE location information. In an aspect, carrier-side LATAC 320 can be embodied on equipment associated with wireless carrier 688. This equipment can include core network components, radio area networks (RANs), NodeBs, etc., as disclosed hereinabove. Carrier-side LATAC 320 can include decision engine component (not illustrated) that can facilitate forming determinations relating to a fraud analysis rule. Decision engine component can include rule component (not illustrated) to facilitate employing one or more fraud analysis rules. Further, decision engine can be communicatively coupled to fraud history information component (not illustrated). Fraud history information component can facilitate receiving historical fraud information. Fraud history information component can include local, remote, or distributed data stores including fraud data and other historical information related to fraud analysis, as disclosed hereinabove.

System 600 can also include vendor 868. Vendor 686 can be a provider of financial services related to a transaction as disclosed hereinabove. Vendor 868 can include vendor-side interface component 660. Vendor-side interface component 660 can facilitate interaction between vendor 686 and other components of system 600.

UE 682 can be associated with a LAT. Vendor 686 can request a fraud factor related to the transaction. The request can cause carrier 688 to receive a transaction identifier from vendor 686 and a UE location from UE 682. The UE location from UE 682 can be received from TFL location determination component 610, which can determine the location of UE 682 by way of TFL information. The location information for UE 682 can be received by carrier-side LATAC 620. The location information can be processed against historical fraud information for locations related to UE 682. A fraud factor can be derived and associated with the received transaction identifier. Vendor 686 can received the transaction identifier and the associated fraud factor by way of vendor-side interface component 660. Based on the fraud factor, the transaction involving 682 can be approved, declined, or further verification can be initiated.

FIG. 6 is presented only to better illustrate some of the benefits of the presently disclosed subject matter and is explicitly not intended to limit the scope of the disclosure to the various aspects particular to the presently illustrated non-limiting example. In some embodiments, the use of GPS or other location technology can be included as complimentary to TFL information without departing from the scope of the present disclosure. It is noteworthy that GPS or other location information from a UE is not required to determine TFL information as disclosed in the related application. Thus, even where legacy UEs, e.g., UEs without GPS or eGPS capabilities, are in system 600, the timing information from those legacy devices can be employed in TFL location information determinations and similarly in fraud analysis for a LAT. This can be particularly useful in regions that have limited distribution of GPS enabled UEs or where GPS functions poorly due to environmental factors such as urban cores, mountainous regions, etc.

Figure 7:
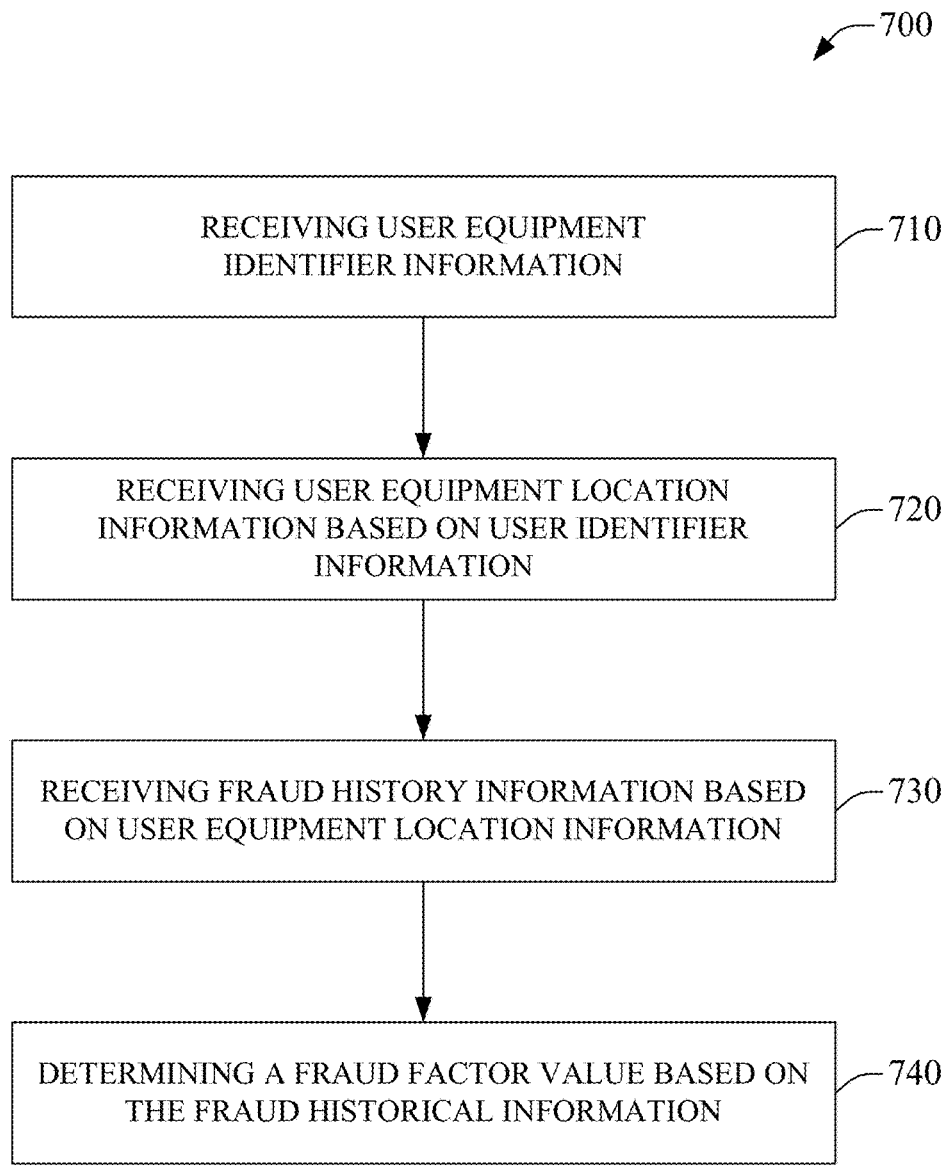
FIG. 7 illustrates a method facilitating fraud analysis for a location aware transaction in accordance with aspects of the subject disclosure.
Figure 8:
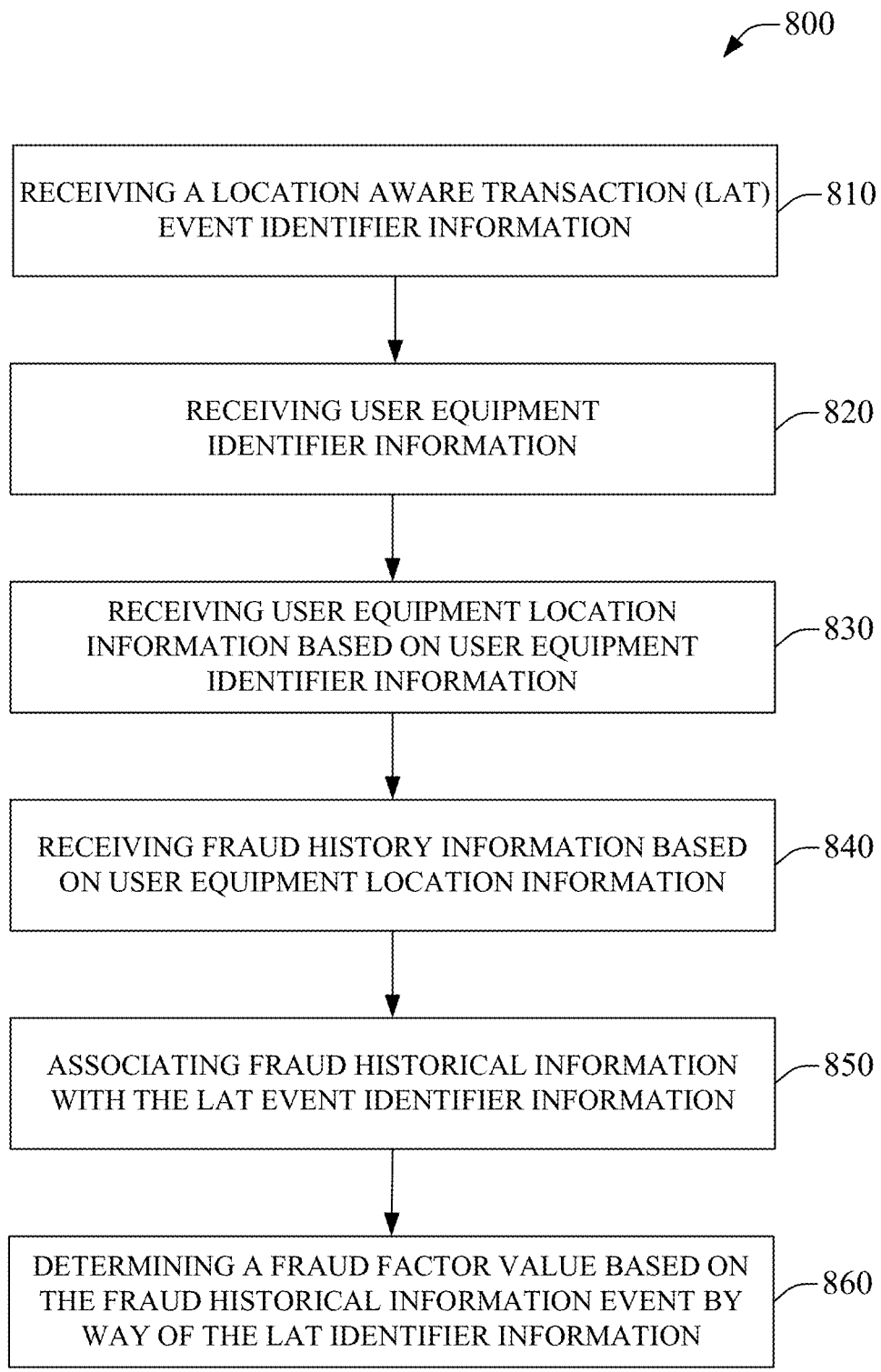
FIG. 8 illustrates a method for facilitating fraud analysis by way of an event identifier associated with a location aware transaction in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates aspects of a method 700 facilitating fraud analysis for a location aware transaction in accordance with aspects of the subject disclosure. At 710, UE identifier information can be received. UE identifier information can include a SIM number, an electronic serial number, a mobile identification number, an IMEI number, etc. The received UE identifier can be employed in looking up UE information including UE location information.

At 720, method 700 can receive location information. The location information can be based on the UE identifier information. Location information can be received from nearly any form of location technology, including, GPS, enhanced GPS (eGPS), triangulation, multilateration, proximity sensing, TFL, inertial sensing, etc. For example, location information can be received from a GPS component of a UE. As a second example, location information can be received from a TFL component.

TFL information can include location information. As such, TFL information can include location information for a UE based on timing information. As a non-limiting example, a mobile device, including mobile devices not equipped with a GPS-type system, can be located by looking up timing information associated with the mobile device from a TFL information reference. As such, the exemplary mobile device can be located using TFL information without employing GPS-type techniques. In an aspect, TFL information can include information to determine a DV(?,X). The centroid region (possible locations between any site pair) for an observed time value associated with any NodeB site pair (NBSP) can be calculated and is related to the determined value (in units of chip) from any pair of NodeBs. When UE time data is accessed, a DV(?,X) look-up can be initiated. Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frames locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is most likely in both sets, it is probable that the location for the UE is at the intersection of the two sets. Additional NBSPs can be included to further narrow the possible locations of the UE. Employing TFL information for location determination is demonstrably different from conventional location determination techniques or systems such as GPS, eGPS, triangulation or multilateration in wireless carrier environments, near field techniques, or proximity sensors.

At 730 of method 700, historical fraud information can be received based on the UE location information. The UE location information can be employed to search historical fraud information for fraudulent activity or events related to the same UE location or nearby locations, e.g., locations within a predetermined range of a received UE location.

At 740, a fraud factor value can be determined based on the fraud history information from 730. At this point, method 700 can end. The fraud factor can be indicative of the relative likelihood of the present transaction being fraudulent based on the historical fraud at the same or nearby locations. Other factors can be incorporated into the fraud factor, e.g., weighting, scalars for other factors such as time since SIM activation, etc., as disclosed herein above. Further, the fraud factor can be included as one factor in a broader fraud determination scheme. As an example, a history of fraud at the location from which a transaction is being initiated from a UE can indicate that fraud is more likely. This exemplary fraud factor can be combined with additional considerations such as a low transaction amount, e.g., $0.99 for an MP3 purchase, etc., and the transaction can be allowed where it is determined that the chance of fraud is not worth aggravating a customer for $0.99 if the transaction turns out to be non-fraudulent. Similarly, where there are only a few instances of fraud near the location of a UE associated with a large transaction, the high transaction amount can be the overriding factor and further verification can be undertaken despite a low likelihood of fraud.

FIG. 8 illustrates a method 800 that facilitates fraud analysis by way of an event identifier associated with a location aware transaction in accordance with aspects of the subject disclosure. At 810 of method 800, a LAT event identifier information can be received. At 820, UE identifier information can be received. The received UE identifier can be employed in looking up UE information including UE location information. At 830, location information for a UE can be received. The location information can be based on the UE identifier information.

At 840 of method 800, historical fraud information can be received based on the UE location information. The UE location information can be employed to search historical fraud information for fraudulent activity or events related to the UE location. At 850, the fraud historical information from 840 can be associated with the LAT identifier information from 810. By associating the fraud history with the LAT identifier, the determination of a fraud factor can occur without specifically needing the user equipment location or the user equipment identifier information. This can provide a level of abstraction that can function to aid in the protection personal information from an entity requesting fraud analysis of a LAT.

At 860, a fraud factor value can be determined based on the historical fraud information identified by way of the associated LAT identifier information. At this point, method 800 can end. The fraud factor can be indicative of the relative likelihood of the present transaction being fraudulent based on the historical fraud information. Other factors can be incorporated into the fraud factor, e.g., weighting, scalars for other factors such as time since SIM activation, etc., as disclosed herein above.

As an example of method 800, a vendor can specify a LAT event identifier that can be received at 810, for example by carrier-side equipment. At 820, the exemplary carrier-side equipment can receive a user equipment identifier information and can employ this identifier to receive location information at 830. The location information can be employed to receive fraud information at 840 related to the UE location from 830. At 850, the fraud information can be associated with the LAT event identifier, for example at the carrier-side equipment. The fraud information can be employed to determine a frauds factor at 860, wherein the fraud factor can, for example be accessed by the vendor equipment by referencing the LAT identifier information. As such, the vendor can provide a reference number that can be associated with a fraud factor by non-vendor systems to protect personal information, and the reference number can be used to access the determined fraud factor by the vendor. In an aspect, method 800 can be executed on systems that are the same as, or similar to, system 300. Of course, other permutations of method 800 can be performed that would be more closely related to execution of systems 400, 500 or hybrids as disclosed hereinabove, all of which are considered within the scope of the present disclosure.

Figure 9:
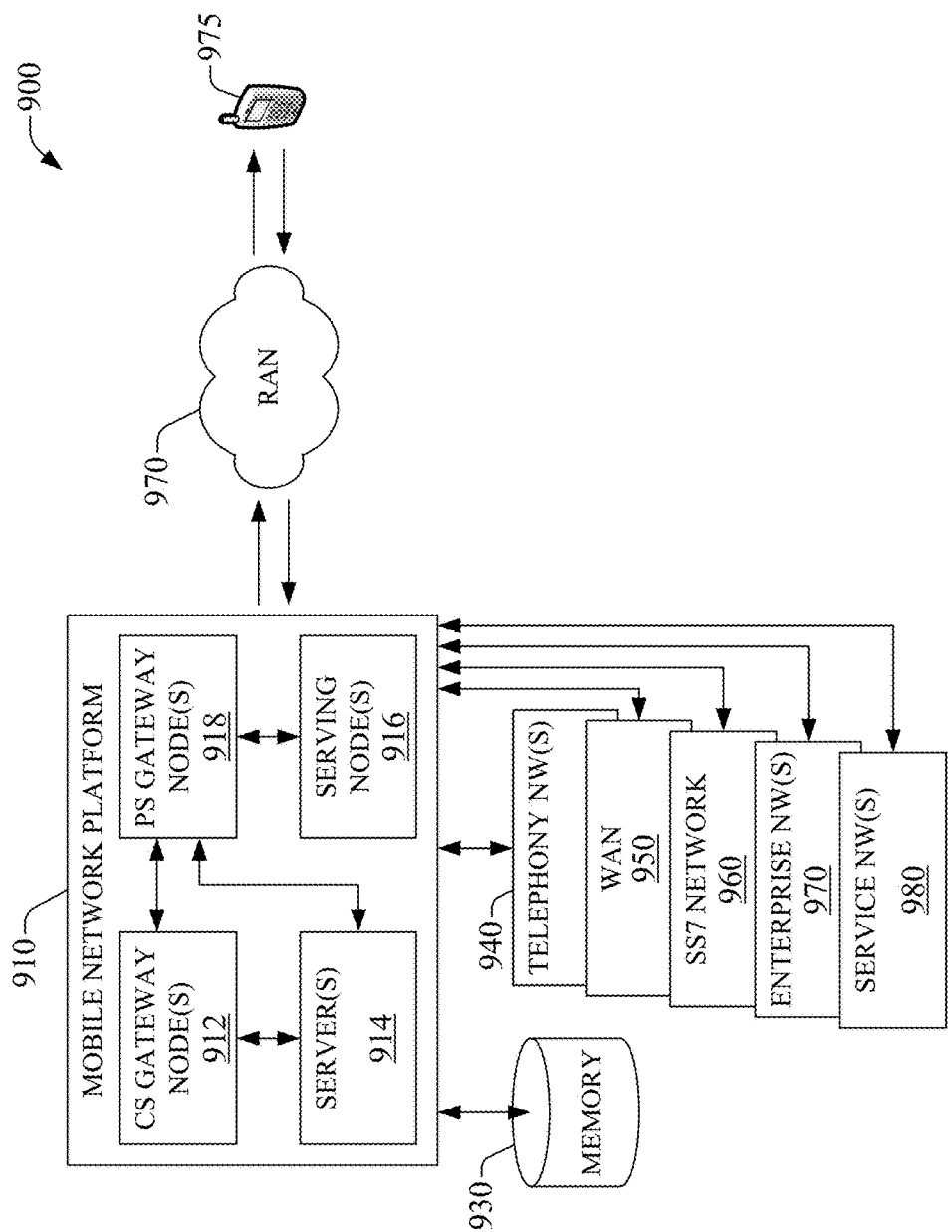
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject innovation described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included as part of a telecommunications carrier network, such as carrier-side LATAC 320 and 620, carrier interface components 470 and 560, or carrier 688, including telecommunications carrier networks employing timed fingerprint location environments. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
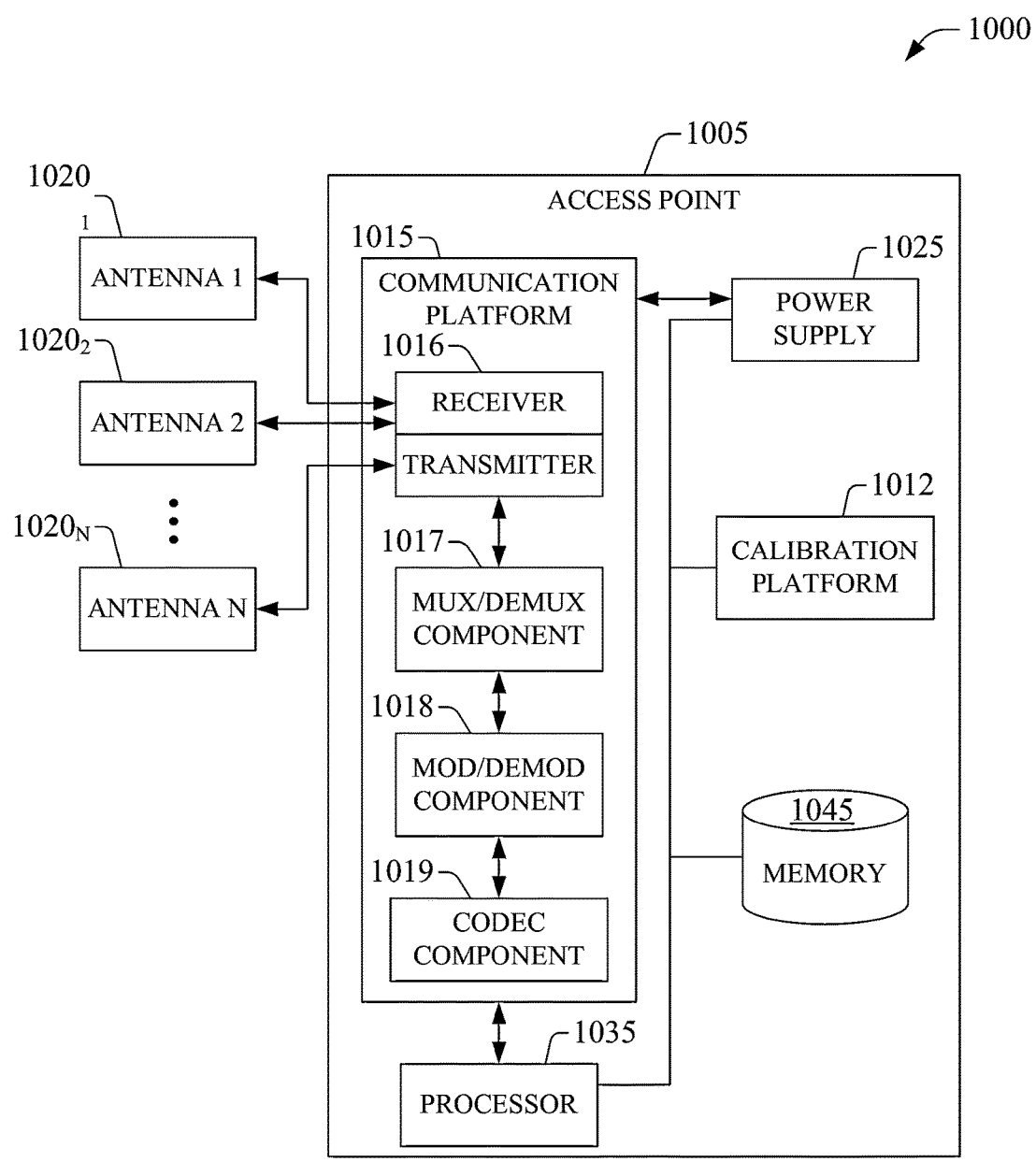
FIG. 10 illustrates a block diagram of an exemplary embodiment of an access point to implement and exploit one or more features or aspects of the subject disclosure.

FIG. 10 illustrates a block diagram of an example embodiment of an access point to implement and exploit one or more features or aspects of the subject innovation. Access point 1000 can be part of a communications framework, for example, a femtocell, a microcell, a picocell, a router, a wireless router, etc. (e.g., access point 696). In embodiment 1000, AP 1005 can receive and transmit signal(s) (e.g., attachment signaling) from and to wireless devices like femtocell access points, access terminals, wireless ports and routers, or the like, through a set of antennas $1020_1$-$1020_N$ (N is a positive integer). It can be noted that antennas $1020_1$-$1020_N$ can be part of communication platform 1015, which comprises electronic components and associated circuitry that provides for processing and manipulation of received electromagnetic signal(s) and electromagnetic signal(s) to be transmitted. Such electronic components and circuitry embody, at least in part, can comprise signaling and traffic components within a communication framework. In some embodiments, communication platform 1015 can include a receiver/transmitter 1016 that can convert signal from analog to digital upon reception, and from digital to analog upon transmission. In addition, receiver/transmitter 1016 can divide a single data stream into multiple, parallel data streams, or perform the reciprocal operation. Coupled to receiver/transmitter 1016 is a multiplexer/demultiplexer 1017 that facilitates manipulation of signal in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information (e.g., codes) according to substantially any code known in the art; e.g., Hadamard-Walsh codes, Baker codes, Kasami codes, polyphase codes, and so on. A modulator/demodulator 1018 is also a part of communication platform 1015, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1015 also includes a coder/decoder (codec) component 1019 that facilitates decoding received signal(s), and coding signal(s) to convey.

Access point 1005 can also include a processor 1035 configured to confer functionality, at least in part, to substantially any electronic component in AP 1005. Power supply 1025 can attach to a power grid and include one or more transformers to achieve a power level that can operate AP 1005 components and circuitry. Additionally, power supply 1025 can include a rechargeable power component to ensure operation when AP 1005 is disconnected from the power grid, or in instances, the power grid is not operating.

Processor 1035 also is functionally connected to communication platform 1015 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1035 is functionally connected, via a data or system bus, to calibration platform 1012 and other components (not shown) to confer, at least in part functionality to each of such components.

In AP 1005, memory 1045 can store data structures, code instructions and program modules, system or device information, code sequences for scrambling, spreading and pilot transmission, location intelligence storage, determined delay offset(s), over-the-air propagation models, and so on. Processor 1035 is coupled to the memory 1045 in order to store and retrieve information necessary to operate and/or confer functionality to communication platform 1015, calibration platform 1012, and other components (not shown) of access point 1005.

Figure 11:
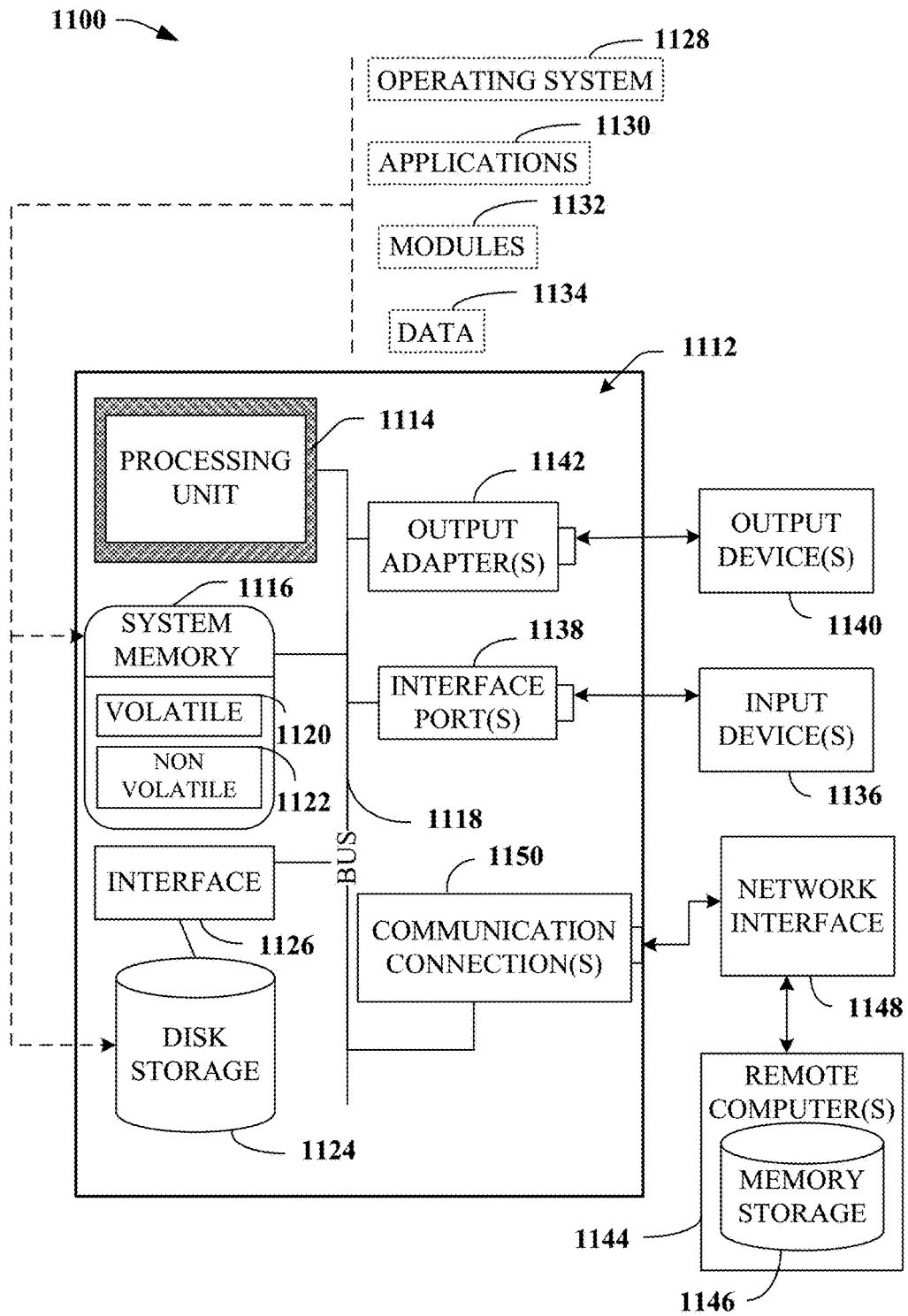
FIG. 11 illustrates a block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in volatile memory 1120, non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of a location determination component or timed fingerprint location component (e.g., 110, 210, 310, 410, 510, and 610), part of the hardware of an analysis component (e.g., LATAC 120, 220, 320, 420, 520 and 620), etc., includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1116 includes volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126. For example, disk storage 1124 can store one or more TFL lookup tables facilitating lookup of location information based on NodeB site pairs and time values, historical fraud information, UE identifiers information, LAT transaction identifiers, etc.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1111 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that typically providing some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving historical fraud information associated with locations; and
determining a value based on satisfaction of a condition relating to the historical fraud information in response to determining a user equipment is proximate to a location of the locations based on timed fingerprint location information, wherein the timed fingerprint location information comprises a timing measurement related to a first pair of NodeB devices, and the timing measurement is correlated to a geographic location to enable determining the location of the user equipment based on determining an intersection of geographic location values of the timed fingerprint location information for the first pair of NodeB devices and other geographic location values of the timed fingerprint location information for another pair of NodeB devices based on a device timing measurement associated with the user equipment.

2. The system of claim 1, wherein the locations comprise locations associated with historical movement of another user equipment associated with the historical fraud information and the determining the value is in response to determining the user equipment is proximate to at least one of the locations.

3. The system of claim 2, wherein the at least one of the locations is associated with a regularly traveled path of the other user equipment.

4. The system of claim 1, wherein the historical fraud information comprises a transaction history associated with a transaction that was originated at the other user equipment and a fraud event history identifying a fraud event associated with the transaction.

5. The system of claim 4, wherein the transaction history spans a designated temporal period.

6. The system of claim 4, wherein the transaction history is reset in response to a triggering event.

7. The system of claim 6, wherein the triggering event is a sale of a property proximate to the location of the locations.

8. The system of claim 6, wherein the triggering event is a change in occupancy of a property proximate to the location of the locations.

9. The system of claim 1, wherein the historical fraud information comprises a transaction history associated with other user equipment associated with the locations.

10. The system of claim 1, wherein the location of the locations is based on a two-dimensional coordinate system.

11. The system of claim 1, wherein the location of the locations is based on a three-dimensional coordinate system.

12. The system of claim 1, wherein the determining the value based on the satisfaction of the condition comprises receiving the value from the user equipment.

13. The system of claim 1, wherein the determining the value based on the satisfaction of the condition comprises receiving the value from a device other than the user equipment.

14. A method, comprising:
receiving, by a system comprising a processor, fraud history information corresponding to a location of a set of locations; and
determining, by the system, a value relating to satisfaction of a condition relating to the fraud history information in response to determining that a mobile device is at the location based on timing information from the mobile device and stored timed fingerprint location information, wherein the stored timed fingerprint location information is determined from differential timing measurement information related to a pair of NodeB devices, and the differential timing measurement information is correlated to a geographic location to enable determining the location of the mobile device based on a comparison of geographic location values for the pair of NodeB devices and other geographic location values for another pair of NodeB devices.

15. The method of claim 14, wherein the set of locations comprises locations associated with historical movement of another mobile device associated with the fraud history information.

16. The method of claim 14, wherein the fraud history information comprises a transaction history associated with a transaction originated at the other mobile device and a fraud event associated with the transaction.

17. A non-transitory computer readable storage device having instructions stored thereon that, in response to execution, cause a system comprising a processor to perform operations, comprising:

receiving historical fraud information associated with a location of locations;

determining a value based on satisfaction of a condition relating to the historical fraud information in response to determining that a user equipment is within a distance of the location based on timed fingerprint location information, wherein the timed fingerprint location information is based on a differential timing measurement for a NodeB site pair comprising a first NodeB device and a second NodeB device, and the differential timing measurement is correlated to location information to enable determining a user equipment location based on an intersection of geographic location values of the timed fingerprint location information for the first pair of NodeB devices and other geographic location values of the timed fingerprint location information for another pair of NodeB devices.

18. The non-transitory computer readable storage device of claim 17, wherein the historical fraud information comprises a transaction history associated with a historical transaction originated at the location and a fraud event associated with the historical transaction, and the transaction history spans a determined temporal period.

19. The non-transitory computer readable storage device of claim 18, wherein the transaction history is reset in response to a triggering event.

20. The non-transitory computer readable storage device of claim 19, wherein the triggering event is a change in occupancy of a residence proximate to the location of the locations.

* * * * *